United States Patent
Shimizu et al.

(10) Patent No.: US 7,528,083 B2
(45) Date of Patent: May 5, 2009

(54) OPTICAL GLASS

(75) Inventors: Koji Shimizu, Sagamihara (JP); Susumu Uehara, Sagamihara (JP)

(73) Assignee: Kabushiki Kaish Ohara, Kanagawa-ken (JP)

( * ) Notice: Subject to any disclaimer, the term of this patent is extended or adjusted under 35 U.S.C. 154(b) by 963 days.

(21) Appl. No.: 10/859,435

(22) Filed: Jun. 2, 2004

(65) Prior Publication Data

US 2005/0026768 A1 Feb. 3, 2005

(30) Foreign Application Priority Data

Jun. 10, 2003 (JP) ............................. 2003-164840

(51) Int. Cl.
*C03C 3/062* (2006.01)
*C03C 3/097* (2006.01)

(52) U.S. Cl. .......................................... 501/73; 501/63

(58) Field of Classification Search .................. 501/63, 501/73
See application file for complete search history.

(56) References Cited

U.S. PATENT DOCUMENTS

| | | | | |
|---|---|---|---|---|
| 4,734,389 A | * | 3/1988 | Grabowski et al. | 501/73 |
| 6,828,265 B2 | * | 12/2004 | Uehara | 501/73 |
| 6,940,220 B2 | * | 9/2005 | Nakashima et al. | 313/495 |
| 7,005,187 B2 | * | 2/2006 | Goto | 428/428 |
| 7,060,640 B2 | * | 6/2006 | Ogino et al. | 501/45 |
| 2003/0191008 A1 | * | 10/2003 | Uehara | 501/73 |
| 2004/0145815 A1 | * | 7/2004 | Endo | 359/642 |
| 2004/0220040 A1 | * | 11/2004 | Uehara | 501/73 |
| 2007/0249480 A1 | * | 10/2007 | Kobayashi et al. | 501/78 |

* cited by examiner

*Primary Examiner*—Karl E Group
*Assistant Examiner*—Elizabeth A Bolden
(74) *Attorney, Agent, or Firm*—James V. Costigan; Hedman & Costigan, P.C.

(57) ABSTRACT

An optical glass having a refractive index (nd) within a range from 1.825 to 1.870, an Abbe number (ν d) within a range from 22 to less than 27, a transformation temperature (Tg) within a range from 530° C. to 585° C. and an mean coefficient of linear thermal expansion (α) within a range from $80 \times 10^{-7}$ °C.$^{-1}$ to $103 \times 10^{-7}$ °C.$^{-1}$, comprising $SiO_2$, $TiO_2$, $Nb_2O_5$ and $Li_2O$ and being substantially free of a Pb compound.

44 Claims, No Drawings

OPTICAL GLASS

TECHNICAL FIELD

This invention relates to an optical glass suitable for press forming which is a high refractive index, high dispersion $SiO_2$—$TiO_2$—$Nb_2O_5$—$Li_2O$ glass having a low transformation temperature (Tg) and a low mean coefficient of linear thermal expansion ($\alpha$).

BACKGROUND ART

There has recently been an increasing tendency toward producing lightweight and compact optical elements such as lenses by employing aspherical lenses made of a high refractive index and high dispersion optical glass and thereby reducing the number of lenses. An attempt for obtaining a aspherical surface by using the conventional grinding and polishing processes, however, requires many costly and complex working processes. Hence there has been developed a method for forming a preform made of a glass gob or glass block directly into lenses by employing a super-precision processed mold. Since the lenses made by this method need not be subjected to grinding and polishing, it has become possible to produce lenses at a lower cost and within a shorter period for delivery. A great deal of research and development have been made on this lens forming method which is called "glass molding" and aspherical lenses for optical instruments made by glass molding have been increasing year after year.

As a glass used for glass molding is sought a glass which is softened at a lower temperature by reason of the heat resisting property of the mold used for glass molding. Optical constants of a lens sought for this purpose are also diversified. For example, as described in Japanese Patent Application Laid-open Publication No. Hei 2-148010 and No. Hei 6-160712, for realizing an optical design which meets a compact and high specification, there is an increasing demand for using high refractive index and high dispersion aspherical lenses. Particularly, optical constants of a refractive index (nd) within a range from 1.825 to 1.870 and an Abbe number (v d) within a range from 22 to less than 27 belong to ranges of the highest refractive index and the highest dispersion for an optical glass sought in this filed of art and, if it becomes possible to manufacture an optical glass having optical constants within these ranges, lenses produced from this optical glass will be able to realize correction of chromatic aberration in a compact optical system at a low cost.

There is, therefore, a strong demand for development of an optical glass suitable for mold pressing having optical constants within these ranges which is very useful for an optical design. However, prior art optical glasses for mold pressing having optical constants within these ranges have poor chemical durability and insufficient resistance to thermal shock and, therefore, chipping and breaking of a glass gob take place frequently during forming of a preform and pressing. Thus, there has been no practical optical glass suitable for mold pressing.

There have been many prior art optical glasses which have optical constants in the vicinity of the optical constants which are desired in the present invention. For example, Japanese Patent Application Laid-open Publication No. 2001-058845 and No. 2002-173336 disclose optical glasses having a phosphate. These glasses, however, do not have sufficient chemical durability and tend to be fused to the press mold. Besides, these glasses have such a high mean coefficient of linear thermal expansion ($\alpha$) that the glasses tend to be damaged during quick cooling or quick heating applied before or after pressing and hence they are not suitable for press forming.

Japanese Patent Application Laid-open Publication No. Sho 58-217451 discloses an optical glass for mold pressing containing a large amount of P or Pb. A glass containing a large amount of P or Pb, however, is highly reactive to a mold in the pressing temperature range and therefore tends to deteriorate the mold and hence it is not suitable for an optical glass for press forming.

Japanese Patent Application Laid-open Publication No. Sho 48-034913 discloses a $K_2O(Na_2O)$—$SiO_2$—$TiO_2$—$Nb_2O_5$ optical glass. This glass, however, is not suitable for press forming because it has transformation temperature (Tg) which is too high for an optical glass for press forming which is looked after today and, moreover, it has a large mean coefficient of linear thermal expansion ($\alpha$) and, therefore, it tends to be damaged during quick cooling or quick heating applied before or after pressing.

Japanese Patent Application Laid-open Publication No. Hei 1-148726 and Japanese Patent Application Laid-open Publication No. Hei 5-051233 disclose glasses which are made of a $Na_2O$—$SiO_2$—$TiO_2$—$Nb_2O_5$ glass added with Ge or Cs. However, these glasses are costly because they require expensive raw materials.

Japanese Patent Application Laid-open Publication No. Sho 52-45612 discloses a $R_2O$—$RO$—$SiO_2$—$Nb_2O_5$ optical glass. This optical glass, however, has a low refractive index (nd) and a large Abbe number (v d) and therefore desired optical constants of high refractive index and high dispersion cannot be achieved by this optical glass. For this reason, this optical glass is not suitable for an optical glass for mold pressing which is required today.

Japanese Patent Application Laid-open Publication No. 2002-87841 discloses a $SiO_2$—$TiO_2$—$Nb_2O_5$—$Na_2O$ glass as a precision press forming material. Since this glass fails to satisfy either of refractive index (nd), Abbe number (v d) and mean coefficient of linear thermal expansion ($\alpha$) which are required today, it is not suitable for a highly refractive optical lens for press forming.

Japanese Patent Application Laid-open Publication No. 2000-016830 discloses an optical glass having a low transformation temperature (Tg). Since, however, this optical glass has a large Abbe number (v d), i.e., low dispersion) or a low refractive index (nd), the optical constants of this optical glass are outside of the optical constants required for an optical glass for mold pressing which is the object of the present invention.

Japanese Patent Application Laid-open Publication No. 2000-344542, No. Sho 61-168551, No. Sho 54-161619, No. Sho 54-161620, No. Sho 49-087716, and No. Sho 58-125636 disclose highly refractive glasses for spectacles which have an mean coefficient of linear thermal expansion ($\alpha$) below 100 $\{10^{-7\circ} C.^{-1}\}$. These glasses, however, have a larger Abbe number (v d) or a lower refractive index (nd) than that of the present invention and, therefore, the optical constants of these glasses are outside of those of an optical glass for mold pressing which is the object of the present invention.

It is an object of the present invention to provide an optical glass for mold pressing which has the above described desired optical constants, a low transformation temperature (Tg) and high resistance to thermal shock.

Thermal stress ($\alpha$) can generally be predicted by the following formula $$\sigma = \lambda \cdot E \cdot \alpha \cdot \Delta T/(1-\nu) \qquad (A)$$

where λ repesents a constant relating to the shape and heat transfer speed, E Young's modulus, α mean coefficient of linear thermal expansion, ΔT temperature difference and ν Possion's ratio.

For reducing thermal stress σ which is represented by the formula (A), it is conceivable, for example, to reduce ΔT. For avoiding abrupt heating and cooling in press forming, it is conceivable to provide a preliminary furnace in a stage before or after the forming process thereby to mitigate abrupt temperature change (ΔT) in the process of rising and falling of temperature. Since, however, this method causes a preform to stay for a long period of time in the preliminary furnace and the forming process which constitute a high temperature condition for a glass, there is high possibility that fine crystals grow in the glass, i.e., devitrificatin takes place. Besides, the provision of one or more preliminary furnaces makes the facility more complicated and prolongs cycle time required for producing a single product with resulting increase in the production cost. Accordingly, there is a limit in the method of reducing the temperature change ΔT in the press forming.

Among the parameters of the above formula (A), values which depend largely on the glass composition are Young's modulus (E), mean coefficient of linear thermal expansion (α) and Poisson's ratio (ν). It is, therefore, important for an optical glass for mold pressing having high resistance to thermal shock to obtain a material which has small values of Young's modulus (E) and mean coefficient of linear thermal expansion (α).

SUMMARY OF THE INVENTION

Studies and experiments made by the inventors of the present invention for achieving the above described object of the invention have resulted in the finding, which has led to the present invention, that an optical glass for mold pressing having high refractive index and high dispersion optical constants and having high resistance to thermal shock can be obtained by adopting $SiO_2$, $TiO_2$, $Nb_2O_5$ and $Li_2O$ as principal components and adjusting the composition having regard to mean coefficient of linear thermal expansion (α) and Young's modulus (E) so as to achieve mean coefficient of linear thermal expansion (α) within a range from 80 $[10^{-7\circ} C.^{-1}]$ to 103 $[10^{-7\circ} C.^{-1}]$ or a value of $-1:E\cdot\alpha/(1-\nu)$ within a range from $1.00\times10^6 [Pa\cdot^\circ C.^{-1}]$ to $1.35\times10^6 [Pa\cdot^\circ C.^{-1}]$.

For achieving the first aspect of the present invention, there is provided an optical glass having a refractive index (nd) within a range from 1.825 to 1.870, an Abbe number (ν d) within a range from 22 to less than 27, a transformation temperature (Tg) within a range from 530° C. to 585° C. and an mean coefficient of linear thermal expansion (α) within a range from $80\times10^{-7\circ} C.^{-1}$ to $103\times10^{-7\circ} C.^{-1}$, comprising $SiO_2$, $TiO_2$, $Nb_2O_5$ and $Li_2O$ and being substantially free of a Pb compound.

In the second aspect of the invention, there is provided an optical glass having a refractive index (nd) within a range from 1.825 to 1.870, an Abbe number (ν d) within a range from 22 to less than 27, a transformation temperature (Tg) within a range from 530° C. to 585° C. and an mean coefficient of linear thermal expansion (α) within a range from $80\times10^{-7\circ} C.-1$ to $100\times10^{-7\circ} C.^{-1}$, comprising $SiO_2$, $TiO_2$, $Nb_2O_5$ and $Li_2O$ and being substantially free of a Pb compound.

In the third aspect of the invention, there is provided an optical glass having a refractive index (nd) within a range from 1.825 to 1.870, an Abbe number (ν d) within a range from 22 to less than 27, a transformation temperature (Tg) within a range from 530° C. to 585° C. and a value of the formula $-1:E\cdot\alpha/(1-\nu)$ (where E represents Young's modulus, α mean coefficient of linear thermal expansion and ν Poisson's ratio) within a range from $1.00<\times 10^6 Pa\cdot^\circ C.^{-1}$ to $1.35\times10^6 Pa\cdot^\circ C.^{-1}$, comprising $SiO_2$, $TiO_2$, $Nb_2O_5$ and $Li_2O$ and being substantially free of a Pb compound.

In the fourth aspect of the invention, there is provided an optical glass as defined in any of the first to third aspects comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

In the fifth aspect of the invention, there is provided an optical glass as defined in any of the first to the third aspect comprising, calculated on oxide basis and expressed in mass %;

| | |
|---|---|
| $SiO_2$ | 20-36% |
| $TiO_2$ | 6-15% |
| $Nb_2O_5$ | more than 42% and 55% or below |
| where $Nb_2O_5/TiO_2$ is 2.9 or over, and | |
| $Li_2O$ | 2-8%. |

In the sixth aspect of the invention, there is provided an optical glass as defined in any of the first to fifth aspects comprising, calculated on oxide basis and expressed in mass %;

| | |
|---|---|
| RO | 0-less than 5% |
| where R is one or more elements selected from the group consisting of Mg, Ca, Sr, Ba and Zn. | |

In the seventh aspect of the invention, there is provided an optical glass as defined in any of the first to sixth aspects comprising, calculated on oxide basis and expressed in mass %;

| | |
|---|---|
| $ZrO_2$ | 0-less than 5% and/or |
| $Na_2O$ | 0-10% and/or |
| $K_2O$ | 0-20%. |

In the eighth aspect of the invention, there is provided an optical glass as defined in any of the first to seventh aspects comprising, calculated on oxide basis and expressed in mass %;

| | |
|---|---|
| $Li_2O + Na_2O + K_2O$ | 10-25%. |

In the ninth aspect of the invention, there is provided an optical glass as defined in any of the first to seventh aspects comprising, calculated on oxide basis and expressed in mass %;

| | |
|---|---|
| $Li_2O + Na_2O + K_2O$ | 10-20%. |

In the tenth aspect of the invention, there is provided an optical glass as defined in any of the first to ninth aspects comprising, calculated on oxide basis and expressed in mass %;

| | |
|---|---|
| $Sb_2O_3$ | 0-1% and/or |
| $RO + ZrO_2 + Li_2O$ | 2-8%. |

In the eleventh aspect of the invention, there is provided an optical glass as defined in any of the first to tenth aspects comprising, calculated on oxide basis and expressed in mass %, $SiO_2$ in an amount larger than 25% and 36% or below.

In the twelfth aspect of the invention, there is provided an optical glass as defined in any of the first to eleventh aspects comprising, calculated on oxide basis and expressed in mass %, $K_2O$ in an amount larger than 10% and 20% or below.

In the thirteenth aspect of the invention, there is provided an optical glass as defined in any of the first to twelfth aspects comprising, calculated on oxide basis and expressed in mass %, $SiO_2$, $TiO_2$, $Nb_2O_5$, $Li_2O$, $Na_2O$ and $K_2O$ in a total amount of 90% or over.

In the fourteenth aspect of the invention, there is provided an optical glass as defined in any of the first to thirteenth aspects having a refractive index (nd) within a range from 1.825 to 1.870, an Abbe number (ν d) within a range from 22 to less than 27, a transformation temperature (Tg) within a range from 530° C. to 585° C., an mean coefficient of linear thermal expansion (α) within a range from $80 \times 10^{-7}$ $°C.^{-1}$ to $103 \times 10^{-7}$ $°C.^{-1}$ and a value of the formula $-1:E·α/(1-ν)$ within a range from $1.00 \times 10^6$ Pa·$°C.^{-1}$ to $1.35 \times 10^6$ Pa·$°C.^{-1}$, and being substantially free of a Pb compound.

In the fifteenth aspect of the invention, there is provided an optical glass as defined in any of the first to thirteenth aspects having a refractive index (nd) within a range from 1.825 to 1.870, an Abbe number (ν d) within a range from 22 to less than 27, a transformation temperature (Tg) within a range from 530° C. to 585° C., an mean coefficient of linear thermal expansion (α) within a range from $80 \times 10^{-7}$ $°C.^{-1}$ to $100 \times 10^{-7}$ $°C.^{-1}$ and a value of the formula $-1:E·α/(1-ν)$ within a range from $1.00 \times 10^6$ Pa·$°C.^{-1}$ to $1.35 \times 10^6$ Pa·$°C.^{-1}$, and being substantially free of a Pb compound.

In the sixteenth aspect of the invention, there is provided an optical glass comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

In the seventeenth aspect of the invention, there is provided an optical glass comprising, calculated on oxide basis and expressed in mass %;

| | |
|---|---|
| $SiO_2$ | 20-36% |
| $TiO_2$ | 6-15% |
| $Nb_2O_5$ | more than 42% and 55% or below |
| where $Nb_2O_5/TiO_2$ is 2.9 or over, and | |
| $Li_2O$ | 2-8%. |

In the eighteenth aspect of the invention, there is provided an optical glass as defined in the sixteenth or seventeenth aspect comprising, calculated on oxide basis and expressed in mass %;

| | |
|---|---|
| RO | 0-less than 5% |
| where R is one or more elements selected from the group consisting of Mg, Ca, Sr; Ba and Zn and/or | |
| $ZrO_2$ | 0-less than 5% and/or |
| $Na_2O$ | 0-10% and/or |
| $K_2O$ | 0-20%. |

In the nineteenth aspect of the invention, there is provided an optical glass as defined in any of the sixteenth to eighteenth aspects comprising, calculated on oxide basis and expressed in mass %;

| | |
|---|---|
| $Li_2O + Na_2O + K_2O$ | 10-25% and/or |
| $Sb_2O_3$ | 0-1% and/or |
| $RO + ZrO_2 + Li_2O$ | 2-8%. |

In the twentieth aspect of the invention, there is provided an optical glass as defined in any of the sixteenth to eighteenth aspects comprising, calculated on oxide basis and expressed in mass %;

| | |
|---|---|
| $Li_2O + Na_2O + K_2O$ | 10-20% and/or |
| $Sb_2O_3$ | 0-1% and/or |
| $RO + ZrO_2 + Li_2O$ | 2-8%. |

In the twenty-first aspect of the invention, there is provided an optical glass as defined in any of the sixteenth to twentieth aspects comprising, calculated on oxide basis and expressed in mass %, $SiO_2$ in an amount larger than 25% and 36% or below.

In the twenty-second aspect of the invention, there is provided an optical glass as defined in any of the sixteenth to twenty-first aspects comprising, calculated on oxide basis and expressed in mass %, $K_2O$ in an amount larger than 10% and 20% or below.

In the twenty-third aspect of the invention, there is provided an optical glass as defined in any of the sixteenth to twenty-second aspects comprising, calculated on oxide basis and expressed in mass %, $SiO_2$, $TiO_2$, $Nb_2O_5$, $Li_2O$, $Na_2O$ and $K_2O$ in a total amount of 90% or over.

In the twenty-fourth aspect of the invention, there is provided an optical glass as defined in any of the first to twenty-third aspects comprising $B_2O_3$ in an amount of less than 5%.

In the twenty-fifth aspect of the invention, there is provided an optical glass as defined in any of the first to twenty-fourth aspects comprising $Ta_2O_5$, $WO_3$ and $GeO_2$ respectively in an amount of less than 5%.

In the twenty-sixth aspect of the invention, there is provided an optical glass as defined in any of the first to twenty-fifth aspects comprising rare earth oxides in an amount of less than 5%.

In the twenty-seventh aspect of the invention, there is provided an optical glass as defined in any of the first to twenty-sixth aspects comprising $Al_2O_3$ in an amount of less than 5%.

In the twenty-eighth aspect of the invention, there is provided an optical glass as defined in any of the first to twenty-seventh aspects comprising $Cs_2O$ in an amount of less than 3%.

In the twenty-ninth aspect of the invention, there is provided an optical glass as defined in any of the first to twenty-eighth aspects comprising $Bi_2O_3$ in an amount of less than 3%.

In the thirtieth aspect of the invention, there is provided an optical glass as defined in any of the first to twenty-ninth aspects having a yield point (At) of 620° C. or below.

In the thirty-first aspect of the invention, there is provided an optical glass as defined in any of the first to thirtieth aspects having a modulus of rigidity (G) of 30 GPa or over.

In the thirty-second aspect of the invention, there is provided an optical glass as defined in any of the first to thirty-first aspects wherein the class (SR) indicating acid-proof property according to the measuring method of International Standard Organization ISO8424: 1996(E) is 1.

In the thirty-third aspect of the invention, there is provided an optical glass as defined in any of the first to thirty-second aspects wherein a part or whole of oxygen atoms of the oxides in the glass composition calculated on oxide basis are substituted by fluorine atoms and a total amount of F contained in fluorides substituting the oxides is within a range from 0 mass part to 5.0 mass parts to 100 mass parts of the glass composition calculated on oxide basis.

The optical glass of the present invention is one for mold pressing comprising $SiO_2$, $TiO_2$, $Nb_2O_5$ and $Li_2O$ and having a refractive index within a range from 1.825 to 1.870 and Abbe number within a range from 22 to less than 27, and having a low transformation temperature and a low mean coefficient of linear thermal expansion. The optical glass of the present invention has excellent resistance to thermal shock as compared with the prior art high refractive index and high dispersion optical glasses for mold pressing under an abrupt temperature change before and after pressing such as quick rise and fall of temperature. Moreover, since the optical glass of the invention has a low mean coefficient of linear thermal expansion, chipping and breaking which take place when a preform or glass gob is formed by direct forming are significantly reduced.

In the high refractive index and high dispersion region of optical glasses for mold pressing, restriction on the diameter and shape of lenses has caused a problem but, according to the optical glass of the present invention, the scope of the press formable shape is considered to expand remarkably due to reduction in chipping and breaking as described above. Accordingly, a very high formability is expected by the optical glass of the invention whereby there is high possibility that it can satisfy the needs for thinning the lens and increasing the diameter of the lens. Further, the optical glass of the present invention can be utilized also for mold pressing of optical elements other than lenses such as prisms, diffraction gratings and reflection mirrors.

Furthermore, the optical glass of the present invention is more stable as a glass than the prior art high refractive index and high dispersion glasses and, therefore, a higher productivity can be expected from the glass of the present invention. In addition, the optical glass of the present invention has excellent chemical durability and homogeneity and good processability and, therefore, it is also suitable for use as lenses which require ordinary grinding and/or polishing.

The optical glass of the present invention is economically advantageous because it is free of ingredients which require cost for environmental protection.

DESCRIPTION OF PREFERRED EMBODIMENTS

The invention will be described more fully below.

Reasons for limiting the values of the respective physical properties and the composition ranges of the respective components as described above will now be described. In the present specification, the phrasing "be substantially free" means that the specific raw material is not added as a material constituting a component of the glass, that is, the raw material is not contained intentionally and does not exclude a case where the raw material is included as an impurity in the glass.

In the present specification, the term "comprising, calculated on oxide basis" means that, assuming that oxides, complex salts, metal fluorides etc. which are used as raw materials of the glass components of the optical glass of the present invention have all been decomposed and converted to oxides during the melting process, each component of the glass comprises a particular ratio to the total weight of the converted oxides which is 100 mass %.

As described above, for realizing an optical design which meets a compact and high specification, the refractive index (nd) should be 1.825 or over, more preferably 1.830 or over and, most preferably, 1.840 or over and should be 1.870 or below and, more preferably be 1.860 or below.

The Abbe number should be 22 or over and, more preferably be 23 or over and should be less than 27, more preferably be 26 or below and, most preferably, be 25 or below.

In the press forming, it is desirable to realize pressing at as low temperature as possible for enabling the mold to enjoy a long life. For this purpose, the optical glass for mold pressing having the optical constants of the present invention is required to have a transformation temperature (Tg) of 600° C. or below. A higher transformation temperature (Tg) shortens the life of the mold. Particularly, it has been found that if an optical glass which is formed by press forming has a transformation temperature (Tg) of 585° C. or below, the life of the mold is significantly prolonged. For achieving a high productivity and a low cost, therefore, the transformation temperature (Tg) should preferably be 585° C. or below. An excessively low transformation temperature (Tg), however, not only deteriorates chemical durability of the glass but makes vitrification difficult resulting in decrease in productivity of the glass. Besides, an excessively low transformation temperature (Tg) increases mean coefficient of linear thermal expansion (α) extremely with resulting deterioration in resistance to thermal shock. Accordingly, the transformation temperature (Tg) should be within a range from 530° C. to 585° C., more preferably be 535° C. or over and/or 570° C. or below and, most preferably, be 540° C. or over and/or 565° C. or below.

Yield point (At) is one of indexes which, as transformation temperature (Tg), indicates the lowest softening point of a glass and is nearer to the press forming temperature. It can, therefore, be an index for estimating easiness of press forming. For the same reason as described above, the yield point should preferably be 640° C. or below for enabling the mold to enjoy a long life. An excessively low temperature, however, deteriorates chemical durability of the glass as described above and, therefore, it should preferably be 560° C. or over.

It should more preferably be 565° C. or over and/or 630° C. or below and, most preferably, be 570° C. or over and/or 620° C. or below.

As for mean coefficient of linear thermal expansion ($\alpha$), it should preferably be low. The upper limit of mean coefficient of linear thermal expansion ($\alpha$) of the prior art glass for glass molding having a refractive index (nd) of less than 1.8 preferably is about 103 [$10^{-7\circ}$ C.$^{-1}$]. If the thermal expansion coefficient exceeds this value, chipping and breaking tend to occur with resulting difficulty in the press forming. An excessively small refractive index, however, makes it difficult to satisfy the transformation temperature (Tg) describe above. In the glass of the present invention, therefore, the mean coefficient of linear thermal expansion ($\alpha$) should be within a range from 80 [$10^{-7\circ}$ C.$^{-1}$] to 103 {$10^{-7\circ}$ C.$^{-1}$}, more preferably be 85 {$10^{-7\circ}$ C.$^{-1}$} or over and/or 100 {$10^{-7\circ}$ C.$^{-1}$} or below and, most preferably, be 88 {$10^{-7\circ}$ C.$^{-1}$} or over and/or 95 {$10^{-7\circ}$ C.$^{-1}$} or below.

For increasing resistance to thermal shock, a low value of $E\cdot\alpha/(1-\nu)$ is desirable. If this value is excessively large, possibility of occurrence of chipping and breaking during the press forming or process of producing a preform increases significantly and, therefore, this value should preferably be $1.35\times10^6$ [Pa·° C.$^{-1}$] or below. Particularly in the optical glass having the optical constants of the present invention, it is desirable that the mean coefficient of linear thermal expansion ($\alpha$) should be 80 [$10^{-7\circ}$ C.$^{-1}$] or over as described above and, therefore, the value of $E\cdot\alpha/(1-\nu)$ should preferably be $1.00\times10^6$ [Pa·° C.$^{-1}$] or over. Accordingly, the value of $E\cdot\alpha/(1-\nu)$ should be within a range from $1.00\times10^6$ [Pa·° C.$^{-1}$] to $1.35\times10^6$ [Pa·° C.$^{-1}$], more preferably be within a range from $1.00\times10^6$ [Pa·° C.$^{-1}$] to $1.25\times10^6$ [Pa·° C.$^{-1}$] and, most preferably, be within a range from $1.00\times10^6$ [Pa·° C.$^{-1}$] to $1.20\times10^6$ [Pa·° C.$^{-1}$].

Description will now be made about components which the optical glass of the present invention can comprise. Unless otherwise described, the composition ratio of each component will be expressed in mass %.

$SiO_2$ is a mold pressing oxide and a component which improves stability and chemical durability of the glass. For achieving these effects sufficiently, it is preferable to contain this component in an amount of 18% or over. If this component is added excessively, the transformation temperature (Tg) rises and it becomes difficult to maintain a refractive index of 1.825 or over and, therefore, this component should be contained in an amount of 36% or below. The amount of this component therefore should be 18% or over and/or 36% or below, more preferably be 20% or over and/or 30% or below and, most preferably, be more than 25% and/or 27.5% or below.

$TiO_2$ is very effective for increasing the refractive index and dispersion. If the amount of this component is too small, these effects cannot be achieved whereas if the amount is excessive, stability of the glass tends to deteriorate. The amount of this component should be 6% or over and/or less than 18%, more preferably be 9% or over and/or 15% or below, and, most preferably, be 10% or over and/or less than 12%.

$Nb_2O_5$ is an important component in the present invention and, particularly, it is an indispensable component in a composition system in which $TiO_2$ and $Li_2O$ coexist for achieving a high refractive index while maintaining excellent stability. If the amount of this component is too small, it becomes difficult to maintain desired optical constants whereas if the amount of this component is excessively large, stability of the glass tends to deteriorate. The amount of this component, therefore, should be more than 42% and/or should be 55% or below, more preferably be more than 43% and/or 52% or below and, most preferably, be 45% or over and/or 48% or below. For achieving these effects at a higher level, the ratio of $Nb_2O_5/TiO_2$ should be 2.7 or over, more preferably be 2.9 or over and, most preferably, be 3.5 or over. By limiting the ratio to this range, crystallizastion of the glass in the press temperature range can be prevented.

$Li_2O$ is a component which contributes more than any other components to maintain a small mean coefficient of linear thermal expansion, enhancing melting of the glass and lowering the transformation temperature (Tg). If the amount of this component is too small, these effects cannot be achieved whereas if the amount of this component is excessively large, it becomes difficult to maintain Abbe number within a desired range. The amount of this component therefore should be 2% or over and/or 8% or below, more preferably be 3% or over and/or 7% or below and, most preferably, be 4% or over and/or 6% or below.

For enhancing melting of the glass and lowering the transformation temperature (Tg), the amount of $Na_2O$ should be 10% or below and the amount of $K_2O$ should be 20% or below. Since $K_2O$ has a larger effect of increasing dispersion than $Na_2O$, in a case where an optical glass having a small Abbe number is required, the amount of $Na_2O$ should preferably be less than 3%. More preferably, the glass should be substantially free of $Na_2O$ but the amount of $K_2O$ should be 8% or over, and, most preferably, be more than 10%. If the total amount of one or more of these alkali components including $Li_2O$ is less than 10%, the above described effects cannot be sufficiently achieved and, for maintaining the mean coefficient of linear thermal expansion at a desired value, the total amount of one or more of these components should preferably be up to 25% and, more preferably, be less than 20%.

$Sb_2O_3$ may be added optionally as a refining agent for refining and homogenizing the glass. Addition of this component up to 1% will suffice.

As for RO components, i.e., MgO, CaO, SrO, BaO and ZnO, one or more components selected from these components may be added in the total amount of less than 5%, if necessary for improving melting property and stability of the glass.

$ZrO_2$ may be added in an amount of less than 5% for adjusting the optical constants and improving chemical durability of the glass. Since, however, this component sometimes deteriorates stability of the glass, it is preferable, in such as case, to restrict the amount of this component to less than 2% and it is more preferable that the glass is substantially free of this component.

For achieving high refractive index and high dispersion characteristics which are one of the features of the present invention, the total amount of the RO components (i.e., one or more components selected from BaO, CaO, MgO, SrO and ZnO), $ZrO_2$ and $Li_2O$ should preferably be 8% or below. Since the glass contains 2-8% $Li_2O$, the total amount of these components should be 2% or over and/or 8% or below, more preferably be 3% or over and/or 7% or below and, most preferably, be 4% or over and/or 6% or below.

There occurs a case where, notwithstanding that the amounts of $SiO_2$, $TiO_2$, $Nb_2O_5$, $Li_2O$, $Na_2O$ and $K_2O$ are within the above described ranges, desired optical constants (nd and $\nu$ d), mean coefficient of linear thermal expansion ($\alpha$) and transformation temperature (Tg) cannot be obtained. In such a case, it is preferable to add these components in an amount of 90% or over and, more preferably, in an amount of 94% or over.

For achieving a low transformation temperature (Tg) without impairing chemical durability of the glass, $B_2O_3$ may be added in an amount of less than 5%. For achieving a higher light transmittance, it is preferable that this component should be added in an amount of 3% or below and it is most preferable that the glass should be substantially free of this component.

For adjusting the optical constants and improving resistance to devitrification and light transmittance, $Ta_2O_5$, $WO_3$ and $GeO_2$ may be added. For reducing the cost which is an object of press forming, the amount of the respective components should be less than 5%, more preferably be 4% or below and, most preferably, be 3% or below.

Likewise, rare earth metal oxides such as $La_2O_3$, $Gd_2O_3$, $Y_2O_3$, $Yb_2O_3$ and $Lu_2O_3$ may be added for improving or adjusting the optical constants and other physical properties such as Young's modulus, hardness and bending strength. Addition of an excessive amount of these components, however, deteriorates stability of the glass. For achieving a glass having a higher dispersion, the respective components should be added in an amount of 5% or below, more preferably be 3% or below and, most preferably, the glass should be substantially free of these components.

$Al_2O_3$ may be added for improving chemical durability of the glass. Since addition of this component sometimes deteriorates stability of the glass, the amount of this component should be less than 5%, more preferably be 3% or below and, most preferably, the glass should be substantially free of this component.

$Cs_2O$ may be added for adjusting the optical constants. Since this component is an expensive material, if it is desired to obtain a low cost glass, the amount of this component should be less than 3%, more preferably be 1% or below and, most preferably, the glass should be substantially free of this component.

$Bi_2O_3$ and $TeO_2$ may be added for achievijhg a high refractive index and low transformation temperature (Tg). Addition of these components, however, sometimes makes the surface of a lens dim due to evaporation in the press forming. Therefore, in such a case, the amount of the respective components should be less than 3%, more preferably be 1% or below and, most preferably, the glass should be substantially free of these components.

Transition metal components such as V, Cr, Mn, Fe, Co, Ni, Cu, Ag and Mo excluding Ti color the glass even in case they are added in a small amount either singly or in combination with resulting absorption of a specific wavelength in the visible range. The optical glass employing wavelengths in the visible range, therefore, should preferably be substantially free of these components.

Rare earth components excluding La and Gd also color the glass when they are added singly or in combination with resulting absorption of a specific wavelength in the visible range. The optical glass employing wavelengths in the visible range, therefore, should preferably be substantially free of these components.

Th may be added for improving stability of the glass, Gd an Tl may be added for achieving a low transformation temperature (Tg) and As may be added for refining or homogenizing the glass. It is, however, a recent tendency to refrain from use of Pb, Th, Cd, Tl, As and Os as harmful chemical substances and, for using them, environmental protection steps must be taken not only in manufacturing the glass but also in processing the glass and dealing with a product made from the glass. In case influence on the environment must be made much of, the glass should preferably be substantially free of these components.

In the optical glass of the present invention, fluorine may be added if necessary. The F component is effective for achieving a high transmittance and also for achieving an optical glass having a low transition point (Tg).

In the optical glass of the present invention, the F component is considered to exist in the form of fluorides wherein a part or whole of oxygen atoms of one or more oxides of Si and other metal elements in the glass composition are substituted by fluorine atoms. If the total amount of F contained in fluorides substituting the oxides is excessively large, evaporation of the F component increases with resulting difficulty in achieving a homogeneous glass. In case addition of F prevents a stable production, this component should not be added. The amount of this component, therefore, should be 5 mass part or below, more preferably 3 mass part or below and, most preferably, be 1 mass part or below to 100 mass parts of the glass composition calculated on oxide basis.

As for modulus of rigidity (G), a high modulus of rigidity of 30 GPa or over is desirable. An excessively high modulus of rigidity, however, tends to cause elevation of the transformation temperature (Tg) and, therefore, it should be 50 GPa or below. The modulus of rigidity should more preferably be 33 GPa or over and/or 47 GPa or below and, most preferably, be 35 GPa or over and/or 45 GPa or below.

As for acid-proof property, the glass should have as high acid-proof property as possible. More specifically, the SR value indicating acid-proof property according to the measuring method of International Standard Organization ISO8424: 1996(E) should be 4 or below, more preferably 3 or below and, most preferably, be 1.

The glass composition of the present invention is expressed in mass % and cannot be expressed in mol % directly. The amounts in mol % of the respective components calculated on oxide basis of the glass composition satisfying the physical properties required in the present invention are generally within the following ranges:

| | |
|---|---|
| $SiO_2$ | 30-50% |
| $TiO_2$ | 5-20% |
| $Nb_2O_5$ | 15-20% and |
| $Li_2O$ | 7-25% and |
| $Na_2O$ | 0-15% and/or |
| $K_2O$ | 0-20% and/or |
| MgO | 0-10% and/or |
| CaO | 0-10% and/or |
| SrO | 0-5% and/or |
| BaO | 0-5% and/or |
| ZnO | 0-5% and/or |
| $ZrO_2$ | 0-5% and/or |
| $B_2O_3$ | 0-10% and/or |
| $Al_2O_3$ | 0-5% and/or |
| $La_2O_3$ | 0-3% and/or |
| $GeO_2$ | 0-5% and/or |
| $Ta_2O_5$ | 0-3% and/or |
| $WO_3$ | 0-% |
| wherein | |
| $LI_2O + Na_2O + K_2O$ | 15-40% |
| $Nb_2O_5/TiO_2$ | 0.85 or over |
| Total amount of RO | 0-10% |
| $RO + ZrO_2 + Li_2O$ | 8-20% |

Compositions of preferred examples (No. 1 to No. 25) of the optical glass of the present invention and comparative examples (No. A to No. J) of the prior art $SiO_2$—$Nb_2O_5$—$R_2O$—RO glasses (respectively calculated on oxide basis and expressed in mass %) as well as optical constants (nd, v d), transformation temperature (Tg), mean coefficient of linear thermal expansion (α), Young's modulus (E) and modulus of rigidity (G) are shown in Tables 1 to 8. Class (SR) of acid-proof property was measured with respect to Example No. 1 to No. 25.

Comparative Example (abbreviated as "Comp. Ex.") No. A to No. D are compositions of the examples having refractive index of 1.80 or over in Japanese Patent Application Laid-open Publication No. 2002-87841, Comparative Example No. E and No. F are compositions of the examples which relatively resemble the composition of the present invention in Japanese Patent Application Laid-open Publication No. Sho 52-45612 and Comparative Example No. G to No. J are compositions of the examples which is free of Pb and has a refractive index of 1.8 or over in Japanese Patent Application Laid-open Publication No. Sho 48-34913.

In these tables, units of respective items are "mass %" with respect to the amounts of the respective components, "° C." with respect to the transformation temperature (Tg), the yield point (At) and the devitrification temperature (abbreviated as "Dev. temp."), "$10^{-7}$ ° $C.^{-1}$" with respect to the mean coefficient of linear thermal expansion, "GPa" with respect to the Young's modulus (E) and the modulus of rigidity (G) and "$10^6$ Pa·° $C.^{-1}$" with respect to $E·\alpha/(1-v)$.

For manufacturing the glasses of Example No. 1 to No. 25, ordinary raw materials for an optical glass such as oxides, carbonates and nitrates were weighed and mixed at a predetermined ratio and the mixed materials were put in a platinum crucible and melted at a temperature within a range from 1100° C. to 1300° C. for two to four hours depending upon melting property of the glass composition. The melt was stirred and thereby homogenized and then, after the temperature was lowered to a proper temperature, the melt was cast into as mold and annealed and glasses having excellent homogeneity were thereby provided easily.

Class (SR) indicating the acid-proof property shows results of measurement conducted in accordance with the measuring method of International Standard Organization ISO8424: 1996(E). SR is a classification made on the basis of time (h) required for corrosion in an amount of 0.1 µm of a glass specimen placed in a predetermined acid treated liquid. SR 1, 2, 3 and 4 indicate that it takes time exceeding 100 hours, 100 hours —10 hours, less than 10 hours —1 hour and less than 1 hour —0.1 hour respectively for corrosion in a nitric acid solution of pH 0.3. SR 5, 51, 52 and 53 indicate that it takes time exceeding 10 hours, 10 hours —1 hour, less than 1 hour —0.1 hour and less than 0.1 hour for corrosion in an acetic acid buffer of pH 4.6. Thus, a smaller value of SR indicates a higher acid-proof property and more excellent chemical durability.

The mean coefficient of linear thermal expansion α ($10^{-7}$/° $C.^{-1}$) was measured in accordance with the measuring method of Japan Optical Glass Industry Association Standard JOGIS 16-$^{1976}$. However, the measurement was made not in the range of measuring temperature of −30° C.-+70° C. as stipulated in this measuring method but in the temperature range of 100° C.-300° C.

Young's modulus (E), modulus of rigidity (G) and Poisson's ratio (v) were measured by the ultrasonic pulse method using a specimen of 100×10×10 mm.

Devitrification temperature was measured in the following manner. The glass was crushed and glass particles which passed through a sieve of 1700 µm and were retained on a sieve of 1400 µm were soaked in alcohol and subjected to ultrasonic cleaning and then were dried in a high temperature tank. These glass particles were placed on a multiplicity of holes each having a diameter of 1 mm which were formed in one line at a certain interval in the longitudinal direction of a platinum port. The glass particles were held for 0.5 hour in an electric furnace in which temperature was adjusted in such a manner that a proper temperature gradient was provided in the longitudinal direction of the port. The glass particles on the platinum port taken out of the furnace were observed, position of the glass particle in which devitrification started was determined and temperature at the position of the glass particle was calculated on the basis of the position and the temperature gradient of the furnace.

TABLE 1

| Example No. | 1 | 2 | 3 | 4 | 5 |
|---|---|---|---|---|---|
| $SiO_2$ | 27.50 | 24.00 | 29.00 | 26.00 | 30.00 |
| $TiO_2$ | 8.00 | 7.00 | 8.00 | 9.00 | 14.00 |
| $ZrO_2$ | 0.00 | 0.00 | 0.00 | 0.00 | 0.00 |
| $Nb_2O_5$ | 51.50 | 53.95 | 50.95 | 47.95 | 43.90 |
| $Li_2O$ | 2.00 | 2.00 | 6.00 | 3.00 | 6.00 |
| $Na_2O$ | 9.00 | 2.00 | 0.00 | 5.00 | 0.00 |
| $K_2O$ | 2.00 | 11.00 | 6.00 | 9.00 | 6.00 |
| $Sb_2O_3$ | 0.00 | 0.05 | 0.05 | 0.05 | 0.10 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| BaO | 0.00 | 0.00 | 0.00 | 0.00 | 0.00 |
| ZnO | 0.00 | 0.00 | 0.00 | 0.00 | 0.00 |
| $B_2O_3$ | 0.00 | 0.00 | 0.00 | 0.00 | 0.00 |
| $Al_2O_3$ | 0.00 | 0.00 | 0.00 | 0.00 | 0.00 |
| $La_2O_3$ | 0.00 | 0.00 | 0.00 | 0.00 | 0.00 |
| $GeO_2$ | 0.00 | 0.00 | 0.00 | 0.00 | 0.00 |
| $Ta_2O_5$ | 0.00 | 0.00 | 0.00 | 0.00 | 0.00 |
| $WO_3$ | 0.00 | 0.00 | 0.00 | 0.00 | 0.00 |
| Total | 100.00 | 100.00 | 100.00 | 100.00 | 100.00 |
| $Li_2O + Na_2O + K_2O$ | 13.00 | 15.00 | 12.00 | 17.00 | 12.00 |
| $Nb_2O_5/TiO_2$ | 6.44 | 7.71 | 6.37 | 5.33 | 3.14 |
| RO | 0.00 | 0.00 | 0.00 | 0.00 | 0.00 |
| $RO + ZrO_2 + Li_2O$ | 2.00 | 2.00 | 6.00 | 3.00 | 6.00 |
| nd | 1.8490 | 1.8545 | 1.8456 | 1.8296 | 1.8472 |
| vd | 23.5 | 23.1 | 24.4 | 24.4 | 23.8 |
| Tg | 571 | 585 | 559 | 550 | 552 |
| At | 609 | 623 | 600 | 592 | 596 |
| Dev. temp. | — | — | — | — | — |
| α | 97 | 87 | 88 | 99 | 88 |
| E | 101 | 94 | 101 | 95 | 102 |
| G | 40 | 37 | 41 | 37 | 41 |
| v | 0.265 | 0.270 | 0.232 | 0.267 | 0.249 |
| $E·\alpha/(1-v)$ | 1.33 | 1.12 | 1.16 | 1.28 | 1.20 |
| SR | 1.0 | 1.0 | 1.0 | 1.0 | 1.0 |

TABLE 2

| Example No. | 6 | 7 | 8 | 9 | 10 |
|---|---|---|---|---|---|
| $SiO_2$ | 34.00 | 24.00 | 27.00 | 28.50 | 26.00 |
| $TiO_2$ | 10.00 | 9.00 | 11.50 | 12.80 | 11.90 |
| $ZrO_2$ | 1.00 | 0.00 | 2.00 | 0.00 | 1.00 |
| $Nb_2O_5$ | 44.00 | 51.00 | 44.90 | 45.40 | 46.00 |
| $Li_2O$ | 7.00 | 4.50 | 4.50 | 5.00 | 5.00 |
| $Na_2O$ | 1.00 | 1.00 | 2.50 | 1.20 | 0.00 |
| $K_2O$ | 3.00 | 10.50 | 7.50 | 7.00 | 10.00 |
| $Sb_2O_3$ | 0.00 | 0.00 | 0.10 | 0.10 | 0.10 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| BaO | 0.00 | 0.00 | 0.00 | 0.00 | 0.00 |
| ZnO | 0.00 | 0.00 | 0.00 | 0.00 | 0.00 |
| $B_2O_3$ | 0.00 | 0.00 | 0.00 | 0.00 | 0.00 |
| $Al_2O_3$ | 0.00 | 0.00 | 0.00 | 0.00 | 0.00 |
| $La_2O_3$ | 0.00 | 0.00 | 0.00 | 0.00 | 0.00 |

TABLE 2-continued

| Example No. | 6 | 7 | 8 | 9 | 10 |
|---|---|---|---|---|---|
| $GeO_2$ | 0.00 | 0.00 | 0.00 | 0.00 | 0.00 |
| $Ta_2O_5$ | 0.00 | 0.00 | 0.00 | 0.00 | 0.00 |
| $WO_3$ | 0.00 | 0.00 | 0.00 | 0.00 | 0.00 |
| Total | 100.00 | 100.00 | 100.00 | 100.00 | 100.00 |
| $Li_2O + Na_2O + K_2O$ | 11.00 | 16.00 | 14.50 | 13.20 | 15.00 |
| $Nb_2O_5/TiO_2$ | 4.40 | 5.67 | 3.90 | 3.55 | 3.83 |
| RO | 0.00 | 0.00 | 0.00 | 0.00 | 0.00 |
| $RO + ZrO_2 + Li_2O$ | 8.00 | 4.50 | 6.50 | 5.00 | 6.00 |
| nd | 1.8256 | 1.8404 | 1.8478 | 1.8498 | 1.8494 |
| νd | 25.0 | 24.2 | 23.8 | 23.7 | 23.8 |
| Tg | 544 | 556 | 553 | 555 | 558 |
| At | 590 | 599 | 595 | 600 | 599 |
| Dev. temp. | — | — | 1014 | — | 1032 |
| α | 89 | 93 | 95 | 91 | 93 |
| E | 101 | 96 | 98 | 100 | 95 |
| G | 40 | 39 | 39 | 40 | 38 |
| ν | 0.263 | 0.231 | 0.259 | 0.250 | 0.250 |
| $E \cdot \alpha/(1-\nu)$ | 1.22 | 1.16 | 1.26 | 1.21 | 1.18 |
| SR | 1.0 | 1.0 | 1.0 | 1.0 | 1.0 |

TABLE 3

| Example No. | 11 | 12 | 13 | 14 | 15 |
|---|---|---|---|---|---|
| $SiO_2$ | 28.40 | 28.00 | 25.50 | 26.40 | 26.99 |
| $TiO_2$ | 15.00 | 11.90 | 11.90 | 13.00 | 11.58 |
| $ZrO_2$ | 0.00 | 0.00 | 0.00 | 0.00 | 0.00 |
| $Nb_2O_5$ | 44.60 | 47.00 | 47.00 | 45.50 | 46.73 |
| $Li_2O$ | 3.00 | 5.00 | 4.50 | 5.00 | 4.53 |
| $Na_2O$ | 9.00 | 0.00 | 0.00 | 0.00 | 0.00 |
| $K_2O$ | 0.00 | 8.00 | 11.00 | 10.00 | 10.07 |
| $Sb_2O_3$ | 0.00 | 0.10 | 0.10 | 0.10 | 0.10 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| BaO | 0.00 | 0.00 | 0.00 | 0.00 | 0.00 |
| ZnO | 0.00 | 0.00 | 0.00 | 0.00 | 0.00 |
| $B_2O_3$ | 0.00 | 0.00 | 0.00 | 0.00 | 0.00 |
| $Al_2O_3$ | 0.00 | 0.00 | 0.00 | 0.00 | 0.00 |
| $La_2O_3$ | 0.00 | 0.00 | 0.00 | 0.00 | 0.00 |
| $GeO_2$ | 0.00 | 0.00 | 0.00 | 0.00 | 0.00 |
| $Ta_2O_5$ | 0.00 | 0.00 | 0.00 | 0.00 | 0.00 |
| $WO_3$ | 0.00 | 0.00 | 0.00 | 0.00 | 0.00 |
| Total | 100.00 | 100.00 | 100.00 | 100.00 | 100.00 |
| $Li_2O + Na_2O + K_2O$ | 12.00 | 13.00 | 15.50 | 15.00 | 14.60 |
| $Nb_2O_5/TiO_2$ | 2.97 | 3.91 | 3.91 | 3.50 | 4.04 |
| RO | 0.00 | 0.00 | 0.00 | 0.00 | 0.00 |
| $RO + ZrO_2 + Li_2O$ | 3.00 | 5.00 | 4.50 | 5.00 | 4.53 |
| nd | 1.8585 | 1.8504 | 1.8489 | 1.8484 | 1.8443 |
| νd | 22.9 | 23.6 | 23.7 | 23.7 | 23.8 |
| Tg | 566 | 563 | 562 | 550 | 563 |
| At | 607 | 605 | 597 | 594 | 601 |
| Dev. temp. | — | — | 1014 | — | 1024 |
| α | 89 | 87 | 93 | 92 | 90 |
| E | 102 | 99 | 96 | 97 | 97 |
| G | 41 | 39 | 38 | 39 | 39 |
| ν | 0.244 | 0.269 | 0.263 | 0.245 | 0.244 |
| $E \cdot \alpha/(1-\nu)$ | 1.20 | 1.18 | 1.21 | 1.18 | 1.15 |
| SR | 1.0 | 1.0 | 1.0 | 1.0 | 1.0 |

TABLE 4

| Example No. | 16 | 17 | 18 | 19 | 20 |
|---|---|---|---|---|---|
| $SiO_2$ | 21.00 | 27.00 | 27.00 | 28.00 | 27.50 |
| $TiO_2$ | 7.00 | 7.00 | 6.00 | 13.00 | 13.00 |
| $ZrO_2$ | 0.00 | 0.00 | 0.00 | 0.00 | 1.00 |
| $Nb_2O_5$ | 54.00 | 45.00 | 43.00 | 44.00 | 43.50 |
| $Li_2O$ | 2.00 | 5.00 | 3.00 | 6.00 | 5.00 |
| $Na_2O$ | 2.00 | 0.00 | 4.00 | 0.00 | 0.00 |
| $K_2O$ | 14.00 | 6.00 | 11.00 | 6.00 | 8.00 |
| $Sb_2O_3$ | 0.00 | 0.00 | 0.00 | 0.00 | 0.00 |
| MgO | 0.00 | 0.00 | 0.00 | 0.00 | 1.00 |
| CaO | 0.00 | 0.00 | 1.00 | 0.00 | 0.00 |
| SrO | 0.00 | 2.00 | 0.00 | 0.00 | 0.00 |
| BaO | 0.00 | 0.00 | 0.00 | 2.00 | 0.00 |
| ZnO | 0.00 | 1.00 | 0.00 | 0.00 | 0.00 |
| $B_2O_3$ | 0.00 | 2.00 | 0.00 | 0.00 | 0.00 |
| $Al_2O_3$ | 0.00 | 0.00 | 0.00 | 1.00 | 0.00 |
| $La_2O_3$ | 0.00 | 2.00 | 3.00 | 0.00 | 0.00 |
| $GeO_2$ | 0.00 | 0.00 | 0.00 | 0.00 | 1.00 |
| $Ta_2O_5$ | 0.00 | 3.00 | 0.00 | 0.00 | 0.00 |
| $WO_3$ | 0.00 | 0.00 | 2.00 | 0.00 | 0.00 |
| Total | 100.00 | 100.00 | 100.00 | 100.00 | 100.00 |
| $Li_2O + Na_2O + K_2O$ | 18.00 | 11.00 | 18.00 | 12.00 | 13.00 |
| $Nb_2O_5/TiO_2$ | 7.71 | 6.43 | 7.17 | 3.38 | 3.35 |
| RO | 0.00 | 3.00 | 1.00 | 2.00 | 1.00 |
| $RO + ZrO_2 + Li_2O$ | 2.00 | 8.00 | 4.00 | 8.00 | 7.00 |
| nd | 1.8426 | 1.8316 | 1.8337 | 1.8384 | 1.8326 |
| νd | 23.7 | 25.0 | 25.1 | 24.8 | 25.0 |
| Tg | 546 | 545 | 560 | 554 | 561 |
| At | 616 | 595 | 608 | 596 | 602 |
| Dev. temp. | — | — | 100 | — | 87 |
| α | 96 | 83 | 100 | 90 | 87 |
| E | 90 | 102 | 93 | 100 | 100 |
| G | 36 | 41 | 37 | 40 | 40 |
| ν | 0.250 | 0.244 | 0.257 | 0.250 | 0.250 |
| $E \cdot \alpha/(1-\nu)$ | 1.15 | 1.12 | 1.25 | 1.20 | 1.16 |
| SR | 1.0 | 1.0 | 1.0 | 1.0 | 1.0 |

TABLE 5

| Example No. | 21 | 22 | 23 | 24 | 25 |
|---|---|---|---|---|---|
| $SiO_2$ | 27.14 | 24.12 | 21.94 | 21.20 | 24.12 |
| $TiO_2$ | 11.56 | 14.57 | 15.82 | 12.50 | 11.56 |
| $ZrO_2$ | 0.00 | 0.00 | 0.00 | 0.00 | 0.00 |
| $Nb_2O_5$ | 46.63 | 43.62 | 43.27 | 45.70 | 46.63 |
| $Li_2O$ | 4.52 | 4.52 | 4.59 | 4.50 | 4.52 |
| $Na_2O$ | 0.00 | 0.00 | 0.00 | 0.00 | 0.00 |
| $K_2O$ | 10.05 | 13.07 | 14.29 | 14.00 | 13.07 |
| $Sb_2O_3$ | 0.10 | 0.10 | 0.00 | 0.10 | 0.00 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| BaO | 0.00 | 0.00 | 0.00 | 0.00 | 0.00 |
| ZnO | 0.00 | 0.00 | 0.00 | 0.00 | 0.00 |
| $B_2O_3$ | 0.00 | 0.00 | 0.00 | 0.00 | 0.00 |
| $Al_2O_3$ | 0.00 | 0.00 | 0.00 | 0.00 | 0.00 |
| $La_2O_3$ | 0.00 | 0.00 | 0.00 | 0.00 | 0.00 |
| $GeO_2$ | 0.00 | 0.00 | 0.00 | 0.00 | 0.00 |
| $Ta_2O_5$ | 0.00 | 0.00 | 0.00 | 0.00 | 0.00 |
| $WO_3$ | 0.00 | 0.00 | 0.00 | 2.00 | 0.00 |
| $As_2O_3$ | 0.00 | 0.00 | 0.10 | 0.00 | 0.10 |
| Total | 100.00 | 100.00 | 100.00 | 100.00 | 100.00 |
| $Li_2O + Na_2O + K_2O$ | 14.57 | 17.59 | 18.88 | 18.50 | 17.59 |
| $Nb_2O_5/TiO_2$ | 4.03 | 2.99 | 2.74 | 3.66 | 4.03 |

TABLE 5-continued

| Example No. | 21 | 22 | 23 | 24 | 25 |
|---|---|---|---|---|---|
| RO | 0.00 | 0.00 | 0.00 | 0.00 | 0.00 |
| RO + ZrO$_2$ + Li$_2$O | 4.52 | 4.52 | 4.59 | 4.50 | 4.52 |
| nd | 1.8460 | 1.8459 | 1.8449 | 1.8445 | 1.8389 |
| νd | 23.8 | 23.7 | 23.8 | 24.0 | 24.2 |
| Tg | 560 | 550 | 544 | 540 | 545 |
| At | 600 | 587 | 576 | 579 | 588 |
| Dev. temp. | — | — | 1027 | — | — |
| α | 91 | 98 | 102 | 103 | 101 |
| E | 96 | 92 | 93 | 94 | 93 |
| G | 36 | 36 | 37 | 38 | 37 |
| ν | 0.333 | 0.278 | 0.257 | 0.237 | 0.239 |
| E · α/(1 − ν) | 1.31 | 1.25 | 1.28 | 1.27 | 1.24 |
| SR | 1.0 | 1.0 | 1.0 | 1.0 | 1.0 |

TABLE 6

| Comp. Ex. No. | A | B | C | D |
|---|---|---|---|---|
| SiO$_2$ | 31.00 | 24.00 | 32.00 | 25.00 |
| TiO$_2$ | 18.00 | 29.00 | 25.00 | 12.00 |
| ZrO$_2$ | 0.00 | 6.00 | 2.00 | 0.00 |
| Nb$_2$O$_5$ | 36.00 | 19.00 | 18.00 | 41.00 |
| Li$_2$O | 5.00 | 1.00 | 2.00 | 4.00 |
| Na$_2$O | 5.00 | 12.00 | 13.00 | 10.00 |
| K$_2$O | 5.00 | 7.00 | 0.00 | 7.00 |
| Sb$_2$O$_3$ | 0.00 | 0.00 | 0.00 | 0.00 |
| MgO | 0.00 | 0.00 | 0.00 | 0.00 |
| CaO | 0.00 | 0.00 | 0.00 | 0.00 |
| SrO | 0.00 | 0.00 | 0.00 | 0.00 |
| BaO | 0.00 | 0.00 | 8.00 | 0.00 |
| ZnO | 0.00 | 0.00 | 0.00 | 0.00 |
| B$_2$O$_3$ | 0.00 | 0.00 | 0.00 | 1.00 |
| Al$_2$O$_3$ | 0.00 | 0.00 | 0.00 | 0.00 |
| La$_2$O$_3$ | 0.00 | 0.00 | 0.00 | 0.00 |
| GeO$_2$ | 0.00 | 0.00 | 0.00 | 0.00 |
| Ta$_2$O$_5$ | 0.00 | 0.00 | 0.00 | 0.00 |
| WO$_3$ | 0.00 | 2.00 | 0.00 | 0.00 |
| Total | 100.00 | 100.00 | 100.00 | 100.00 |
| Li$_2$O + Na$_2$O + K$_2$O | 15.00 | 20.00 | 15.00 | 21.00 |
| Nb$_2$O$_5$/TiO$_2$ | 2.00 | 0.66 | 0.72 | 3.42 |
| RO | 0.00 | 0.00 | 8.00 | 0.00 |
| RO + ZrO$_2$ + Li$_2$O | 5.00 | 7.00 | 12.00 | 4.00 |
| nd | 1.8283 | 1.8317 | 1.8057 | 1.8020 |
| νd | 24.3 | 23.4 | 25.2 | 26 |
| Tg | 541 | 546 | 567 | 495 |
| At | 578 | 585 | 606 | 540 |
| Dev. temp. | — | — | — | — |
| α | 101 | 117 | 107 | 123 |
| E | 102 | 92 | 100 | 94 |
| G | 41 | 36 | 40 | 38 |
| ν | 0.240 | 0.280 | 0.250 | 0.230 |
| E · α/(1 − ν) | 1.36 | 1.50 | 1.43 | 1.50 |
| SR | — | — | — | — |

TABLE 7

| Comp. Ex. No. | E | F |
|---|---|---|
| SiO$_2$ | 20.00 | 15.00 |
| TiO$_2$ | 0.00 | 0.00 |
| ZrO$_2$ | 0.00 | 0.00 |
| Nb$_2$O$_5$ | 40.00 | 45.00 |
| Li$_2$O | 5.00 | 0.00 |
| Na$_2$O | 5.00 | 15.00 |
| K$_2$O | 15.00 | 20.00 |
| Sb$_2$O$_3$ | 0.00 | 0.00 |
| MgO | 0.00 | 0.00 |
| CaO | 5.00 | 0.00 |
| SrO | 0.00 | 0.00 |
| BaO | 0.00 | 5.00 |
| ZnO | 0.00 | 0.00 |
| B$_2$O$_3$ | 0.00 | 0.00 |
| Al$_2$O$_3$ | 0.00 | 0.00 |
| La$_2$O$_3$ | 0.00 | 0.00 |
| GeO$_2$ | 0.00 | 0.00 |
| Ta$_2$O$_5$ | 10.00 | 0.00 |
| WO$_3$ | 0.00 | 0.00 |
| Total | 100.00 | 100.00 |
| Li$_2$O + Na$_2$O + K$_2$O | 25.00 | 35.00 |
| Nb$_2$O$_5$/TiO$_2$ | — | — |
| RO | 5.00 | 5.00 |
| RO + ZrO$_2$ + Li$_2$O | 10.00 | 5.00 |
| nd | | Unvitrified |
| νd | | Unmeasurable |
| Tg | | |
| At | | |
| Dev. temp. | | |
| α | | |
| E | | |
| G | | |
| ν | | |
| E · α/(1 − ν) | | |
| SR | | |

TABLE 8

| Comp. Ex. No. | G | H | I | J |
|---|---|---|---|---|
| SiO$_2$ | 15.00 | 5.00 | 16.00 | 17.00 |
| TiO$_2$ | 25.00 | 30.00 | 31.00 | 41.00 |
| ZrO$_2$ | 0.00 | 0.00 | 0.00 | 0.00 |
| Nb$_2$O$_5$ | 40.00 | 0.00 | 33.00 | 0.00 |
| Li$_2$O | 0.00 | 0.00 | 0.00 | 0.00 |
| Na$_2$O | 0.00 | 0.00 | 0.00 | 0.00 |
| K$_2$O | 20.00 | 25.00 | 20.00 | 25.00 |
| Sb$_2$O$_3$ | 0.00 | 0.00 | 0.00 | 0.00 |
| MgO | 0.00 | 0.00 | 0.00 | 0.00 |
| CaO | 0.00 | 0.00 | 0.00 | 0.00 |
| SrO | 0.00 | 0.00 | 0.00 | 0.00 |
| BaO | 0.00 | 0.00 | 0.00 | 0.00 |
| ZnO | 0.00 | 0.00 | 0.00 | 0.00 |
| B$_2$O$_3$ | 0.00 | 0.00 | 0.00 | 0.00 |
| Al$_2$O$_3$ | 0.00 | 0.00 | 0.00 | 0.00 |
| La$_2$O$_3$ | 0.00 | 0.00 | 0.00 | 0.00 |
| GeO$_2$ | 0.00 | 40.00 | 0.00 | 17.00 |
| Ta$_2$O$_5$ | 0.00 | 0.00 | 0.00 | 0.00 |
| WO$_3$ | 0.00 | 0.00 | 0.00 | 0.00 |
| Total | 100.00 | 100.00 | 100.00 | 100.00 |
| Li$_2$O + Na$_2$O + K$_2$O | 20.00 | 25.00 | 20.00 | 25.00 |
| Nb$_2$O$_5$/TiO$_2$ | 1.60 | 0.00 | 1.06 | 0.00 |
| RO | 0.00 | 0.00 | 0.00 | 0.00 |
| RO + ZrO$_2$ + Li$_2$O | 0.00 | 0.00 | 0.00 | 0.00 |
| nd | 1.8744 | 1.8199 | 1.8746 | 1.8021 |
| νd | 21.7 | 22.1 | 21 | 23.3 |
| Tg | 588 | 572 | 611 | 568 |
| At | 624 | 610 | 643 | 603 |
| Dev. temp. | — | — | — | — |
| α | 105 | 119 | 104 | 121 |
| E | 76 | 67 | 76 | 69 |
| G | 30 | 26 | 30 | 27 |
| ν | 0.267 | 0.288 | 0.267 | 0.278 |
| E · α/(1 − ν) | 1.09 | 1.12 | 1.08 | 1.16 |
| SR | — | — | — | — |

As shown in Tables 1 to 5, the glasses of Example No. 1 to No. 25 of the present invention have refractive index (nd), Abbe number (ν d), transformation temperature (Tg) and mean coefficient of linear thermal expansion (α) within desired ranges. The class (SR) showing acid-proof property of all examples is 1 which indicates that the glasses have particularly excellent acid-proof property and chemical durability. The examples also have values of E·α/(1−ν) within the desired range. The glasses of the examples, therefore, all have high refractive index and high dispersion characteristics and sufficient resistance to thermal shock and are expected to have reduced defects due to chipping and breaking in the press forming and thereby have improved productivity.

On the other hand, the glasses of Comparative Example No. A to No. D all fail to satisfy the composition range required in the present invention and the glasses of Comparative Example No. B to No. D fail to satisfy the mean coefficient of linear thermal expansion required in the present invention. As for E·α/(1−ν), all of Comparative Example No. A to No. D have values exceeding $1.35 \times 10^6$ which indicates that these glasses have poor resistance to thermal shock and tend to give rise to chipping and breaking and, therefore, are not suitable for the press forming.

The glasses of Comparative Example No. E and No. F have a lower refractive index as described than the glasses of the examples of the present invention due to lack of $TiO_2$ in their compositions and, therefore, their utility in the optical design is low. Further, it was attempted to melt raw materials of these glasses at 1300° C. by using the same melting process as in the present invention but neither of these comparative examples was vitrified.

The glasses of Comparative Example No. G to No. J fail to satisfy either of refractive index, Abbe number and transformation temperature required in the present invention due to their failure to satisfy the composition range of the present invention. Further, all of these comparative examples had mean coefficient of linear thermal expansion exceeding 103 ($10^{-7}$ °C.$^{-1}$) and, therefore, are not suitable for an optical glass for press forming.

INDUSTRIAL APPLICABILITY

The present invention relates to an optical glass suitable for mold forming which is applicable to lenses and other optical elements such as prisms, refraction gratings and reflection mirrors.

What is claimed is:

1. An optical glass having a refractive index (nd) within a range from 1.825 to 1.870, an Abbe number (νd) within a range from 22 to less than 27, a transformation temperature (Tg) within a range from 530° C. to 585° C. and a mean coefficient of linear thermal expansion (α) within a range from $80 \times 10^{-7}$ °C.$^{-1}$ to $103 \times 10^{-7}$ °C.$^{-1}$, comprising $SiO_2$, $TiO_2$, $Nb_2O_5$ and $Li_2O$ and being substantially free of a Pb compound comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

2. An optical glass having a refractive index (nd) within a range from 1.825 to 1.870, an Abbe number (νd) within a range from 22 to less than 27, a transformation temperature (Tg) within a range from 530° C. to 585° C. and a mean coefficient of linear thermal expansion (α) within a range from $80 \times 10^{-7}$ °C.$^{-1}$ to $100 \times 10^{-7}$ °C.$^{-1}$, comprising $SiO_2$, $TiO_2$, $Nb_2O_5$ and $Li_2O$ and being substantially free of a Pb compound comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

3. An optical glass having a refractive index (nd) within a range from 1.825 to 1.870, an Abbe number (νd) within a range from 22 to less than 27, a transformation temperature (Tg) within a range from 530° C. to 585° C. and a value of the formula −1:E·α/(1−ν) (where E represent Young's modulus, α is the mean coefficient of linear thermal expansion and ν is Poisson's ratio) within a range from $1.00 \times 10^6$ Pa·° C.$^{-1}$ to $1.35 \times 10^6$ Pa·° C.$^{-1}$, comprising $SiO_2$, $TiO_2$, $Nb_2O_5$ and $Li_2O$ and being substantially free of a Pb compound comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

4. An optical glass having a refractive index (nd) within a range from 1.825 to 1.870, an Abbe number (νd) within a range from 22 to less than 27, a transformation temperature (Tg) within a range from 530° C. to 585° C., a mean coefficient of linear thermal expansion (α) within a range from $80 \times 10^{-7}$ °C.$^{-1}$ to $103 \times 10^{-7}$ °C.$^{-1}$ and a value of the formula −1:E·α/(1−ν) within a range from $1.00 \times 10^6$ Pa·° C.$^{-1}$ to $1.35 \times 10^6$ Pa·° C.$^{-1}$, and being substantially free of a Pb compound comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

5. An optical glass having a refractive index (nd) within a range from 1.825 to 1.870, an Abbe number (ν) within a range from 22 to less than 27, a transformation temperature (Tg) within a range from 530° C. to 585° C., a mean coefficient of linear thermal expansion (α) within a range from $80 \times 10^{-7}$ °C.$^{-1}$ to $100 \times 10^{-7}$ °C.$^{-1}$ and a value of the formula −1:·α/(1−ν) (where E represents Young's modulus, a mean coefficient of linear thermal expansion and ν Poisson's ratio) within a range from $1.00 \times 10^6$ Pa·° C.$^{-1}$ to $1.35 \times 10^6$ Pa·° C.$^{-1}$, and being substantially free of a Pb compound comprising, calculated on oxide basis and expressed in mass %;

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

6. An optical glass as defined in any of claims 1-5 comprising, calculated on oxide basis and expressed in mass %;

| | |
|---|---|
| $SiO_2$ | 20-36% |
| $TiO_2$ | 6-15% |
| $Nb_2O_5$ | more than 42% and 55% or below |
| where $Nb_2O_5/TiO_2$ is 2.9 or over, and | |
| $Li_2O$ | 2-8%. |

7. An optical glass as defined in claims 1-5 comprising, calculated on oxide basis and expressed in mass %;

| | |
|---|---|
| RO | 0-less than 5% |
| where R is one or more elements selected from the group consisting of Mg, Ca, Sr, Ba and Zn. | |

8. An optical glass as defined in claim 6 comprising, calculated on oxide basis and express in mass %;

| | |
|---|---|
| RO | 0-less than 5% |
| where R is one or more elements selected from the group consisting of Mg, Ca, Sr, Ba and Zn. | |

9. An optical glass as defined in claims 1-5 comprising, calculated on oxide basis and expressed in mass %;

| | |
|---|---|
| $ZrO_2$ | 0-less than 5% and/or |
| $Na_2O$ | 0-10% and/or |
| $K_2O$ | 0-20%. |

10. An optical glass as defined in claim 6 comprising, calculated on oxide basis and expressed in mass %;

| | |
|---|---|
| $ZrO_2$ | 0-less than 5% and/or |
| $Na_2O$ | 0-10% and/or |
| $K_2O$ | 0-20%. |

11. An optical glass as defined in claims 1-5 comprising, calculated on oxide basis and expressed in mass %;

| | |
|---|---|
| $Li_2O + Na_2O + K_2O$ | 10-25%. |

12. An optical glass as defined in claim 6 comprising, calculated on oxide basis and expressed in mass %;

| | |
|---|---|
| $Li_2O + Na_2O + K_2O$ | 10-25%. |

13. An optical glass as defined in claims 1-5 comprising, calculated on oxide basis and expressed in mass %;

| | |
|---|---|
| $Li_2O + Na_2O + K_2O$ | 10-20%. |

14. An optical glass as defined in claim 6 comprising, calculated on oxide basis and expressed in mass %;

| | |
|---|---|
| $Li_2O + Na_2O + K_2O$ | 10-20%. |

15. An optical glass as defined in claims 1-5 comprising, calculated on oxide basis and expressed in mass %;

| | |
|---|---|
| $Sb_2O_3$ | 0-1% and/or |
| $RO + ZrO_2 + Li_2O$ | 2-8%. |

16. An optical glass as defined in claim 6 comprising, calculated on oxide basis and expressed in mass %;

| | |
|---|---|
| $Sb_2O_3$ | 0-1% and/or |
| $RO + ZrO_2 + Li_2O$ | 2-8%. |

17. An optical glass as defined in claims 1-5 comprising, calculated on oxide basis and expressed in mass %, $SiO_2$ in an amount larger than 25% and 36% or below.

18. An optical glass as defined in claim 6 comprising, calculated on oxide basis and expressed in mass %, $SiO_2$ in an amount larger than 25% and 36% or below.

19. An optical glass as defined in claims 1-5 comprising, calculated on oxide basis and expressed in mass %, $K_2O$ in an amount larger than 10% and 20% or below.

20. An optical glass as defined in claim 6 comprising, calculated on oxide basis and expressed in mass %, $K_2O$ in an amount larger than 10% and 20% or below.

21. An optical glass as defined in any of claim 1-5 comprising, calculated on oxide basis and expressed in mass %, $SiO_2$, $TiO_2$, $Nb_2O_5$, $Li_2O$, $Na_2O$ and $K_2O$ in a total amount of 90% or over.

22. Art optical glass as defined in claims 1-5 comprising, calculated on oxide basis and expressed in mass %, $SiO_2$, $TiO_2$, $Nb_2O_5$, $Li_2O$, $Na_2O$ and $K_2O$ in a total amount of 90% or over.

23. An optical glass as defined in claim 6 comprising, calculated on oxide basis and expressed in mass %, $SiO_2$, $TiO_2$, $Nb_2O_5$, $Li_2O$, $Na_2O$ and $K_2O$ in a total amount of 90% or over.

24. An optical glass comprising, calculated on oxide basis and expressed in mass %:

| | |
|---|---|
| $SiO_2$ | 25-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

25. An optical glass comprising, calculated on oxide basis and expressed in mass %:

| | |
|---|---|
| $SiO_2$ | 18-36% |
| $TiO_2$ | 6-less than 18% |
| $Nb_2O_5$ | more than 42% and 55% or below |
| where $Nb_2O_5/TiO_2$ is 2.7 or over, and | |
| $Li_2O$ | 2-8%. |

$K_2O$ in an amount larger than 10% and 20% or below.

26. An optical glass as defined in claims 1-5 comprising $B_2O_3$ in an amount of less than 5%.

27. An optical glass as defined in claim 6 comprising $B_2O_3$ in an amount of less than 5%.

28. An optical glass as defined in claims 1-5 comprising $Ta_2O_5$, $WO_3$ and $GeO_2$ respectively in an amount of less than 5%.

29. An optical glass as defined in claim 6 comprising $Ta_2O_5$, $WO_3$ and $GeO_2$ respectively in an amount of less than 5%.

30. An optical glass as defined in claims 1-5 comprising rare earth oxides in an amount of less than 5%, $Al_2O_3$ in an amount of less than 5% and $Cs_2O$ in an amount of less than 3%.

31. An optical glass as defined in claim 6 comprising rare earth oxides in an amount of less than 5%, $Al_2O_3$ in an amount of less than 5% and $Cs_2O$ in an amount of less than 3%.

32. An optical glass as defined in claims 1-5 comprising $Bi_2O_3$ in an amount of less than 3%.

33. An optical glass as defined in claim 6 comprising $Bi_2O_3$ in an amount of less than 3%.

34. An optical glass as defined in claims 1-5 having a yield point (At) of 620° C. or below.

35. An optical glass as defined in claim 6 having a yield point (At) of 620° C. or below.

36. An optical glass as defined in claims 1-5 having a modulus of rigidity (G) of 30 GPa or over.

37. An optical glass as defined in claim 6 having a modulus of rigidity (G) of 30 GPa or over.

38. An optical glass as defined in claims 1-5 wherein the class (SR) indicating acid-proof property according to the measuring method of International Standard Organization ISO8424: 1996(E) is 1.

39. An optical glass as defined in claims 6 wherein the class (SR) indicating acid-proof property according to the measuring method of International Standard Organization ISO8424: 1996(E) is 1.

40. An optical glass as defined in claims 1-5 wherein a part or whole of oxygen atoms of the oxides in the glass composition calculated on oxide basis are substituted by fluorine atoms and a total amount of F contained in fluorides substituting the oxides is within a range from 0 mess part to 5.0 mass parts to 100 mass parts of the glass composition calculated on oxide basis.

41. An optical glass as defined in claim 6 wherein a part or whole of oxygen atoms of the oxides in the glass composition calculated on oxide basis are substituted by fluorine atoms and a total amount of F contained in fluorides substituting the oxides is within a range from 0 mass part to 5.0 mass parts to 100 mass parts of the glass composition calculated on oxide basis.

42. An optical glass having a refractive index (nd) within a range from 1.825 to 1.870, an Abbe number (vd) within a range from 22 to less than 27, a transformation temperature (Tg) within a range from 530° C. to 585° C., an mean coefficient of linear thermal expansion ($\alpha$) within a range from $80 \times 10^{-7}$ °C.$^{-1}$ to $103 \times 10^{-7}$ °C.$^{-1}$ and a value of the formula $-1 : E \cdot \alpha/(1-v)$ (where E represents Young's modulus, $\alpha$ mean coefficient of linear thermal expansion and $v$ Poisson's ratio) within a range from $1.00 \times 10^6$ Pa·°C.$^{-1}$ to $1.35 \times 10^6$ Pa·°C.$^{-1}$, and comprising, calculated on oxide basis and expressed in mass %:

| | |
|---|---|
| $SiO_2$ | 18-36% |
| $TiO_2$ | 6-less than 18% |
| $Nb_2O_5$ | more than 42% and 55% or below |
| $Li_2O$ | 2-8% |
| $Sb_2O_3$ | 0-1% and/or |
| RO | 0-less than 5% | where R is an element or elements selected from the group consisting of Mg, Ca, Sr, Ba and Zn, and/or

| | |
|---|---|
| $ZrO_2$ | 0-less than 5% and/or |
| $Na_2O$ | 0-10% and/or |
| $K_2O$ | 0-20%. | a total amount of $Li_2O$, $Na_2O$ and $K_2O$ being 10-25%, a value of $Nb_2O_5/TiO_2$ being 2.7 or over, a total amount of RO, $ZrO_2$ and $Li_2O$ being 2-8% and a total amount of $SiO_2$, $TiO_2$, $Nb_2O_5$, $Li_2O$, $Na_2O$ and $K_2O$ being 90%, and being substantially free of a Pb compound.

43. An optical glass comprising, calculated on oxide basis and expressed in mass %:

| | |
|---|---|
| $SiO_2$ | 25-36% |
| $TiO_2$ | 6-15% |
| $Nb_2O_5$ | more than 42% and 55% or below |
| | where $Nb_2O_5/TiO_2$ is 2.9 or over, and |
| $Li_2O$ | 2-8%. |

44. An optical glass comprising, calculated on oxide basis and expressed in mass %:

| | |
|---|---|
| $SiO_2$ | 20-36% |
| $TiO_2$ | 6-15 |
| $Nb_2O_5$ | more than 42% and 55% or below |
| | where $Nb_2O_5/TiO_2$ is 2.7 or over, |
| $Li_2O$ | 2-8% and |
| $K_2O$ in an amount larger than 10% and 20% or below. | |

* * * * *